April 1, 1952 P. J. H. JANSSEN 2,591,264

TELEVISION RECEIVER

Filed July 19, 1948

INVENTOR
PETER JOHANNES HUBERTUS JANSSEN
BY [signature]
ATTORNEY.

Patented Apr. 1, 1952 2,591,264

UNITED STATES PATENT OFFICE 2,591,264

TELEVISION RECEIVER

Peter Johannes Hubertus Janssen, Eindhoven, Netherlands, assignor to Hartford National Bank and Trust Company, Hartford, Conn., as trustee Application July 19, 1948, Serial No. 39,473
In the Netherlands August 14, 1947

5 Claims. (Cl. 178—5.8)

Figure 1:
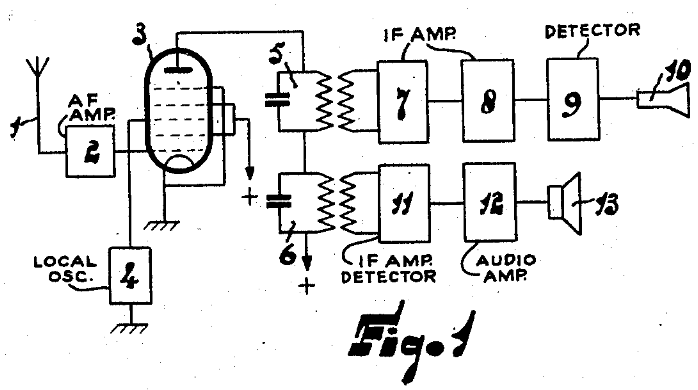

The invention relates to a television receiver in which the television image and sound signals to be received are mixed with an auxiliary oscillation of constant frequency produced by a local oscillator.

If for the reception of the television sound signal use is made of part of a broadcast sound receiver, it is known that the frequency of this auxiliary oscillation may be chosen to be such that the oscillation produced by the combination of the television sound signals with the fundamental frequency of the said auxiliary oscillation exhibits a frequency which is equal to the intermediate frequency of the receiver for broadcast sound signals.

It is to be noted here that the term "intermediate frequency of the receiver for broadcast sound signals" is to be understood to mean not only the intermediate frequency used for normal broadcast receivers, but also those frequencies which may be used in the said broadcast receiver in a simple manner, for example by subsequently bringing into circuit or cutting impedances, this possibility of varying the usable intermediate frequency being, as a matter of course, limited by the further circuit arrangement of the broadcast receiver.

On the frequency of the auxiliary oscillation of the local oscillator being fixed in this manner, the intermediate frequency of the image signals for the television receiver is, however, also fixed.

However, it has now been found that the intermediate frequency for the image signals which is thus produced is not efficiently serviceable for correct image reception, since, inter alia the said intermediate frequency is very small compared with the frequency of the image carrier-wave, so that undue interferences, such as whistling noise, may result.

The invention has for its object to provide a television receiver in which the intermediate frequency of the television image channel has a more favourable value with respect to the image carrier-wave frequency and it exhibits the feature that the intermediate frequency for the sound channel is equal to a combination of the frequency of the incoming sound carrier oscillation and a harmonic of the auxiliary oscillation.

If the intermediate frequency of the television sound channel is produced in this manner, it is possible, when using an intermediate frequency for the television sound channel which frequency is low compared with the frequency of the incoming television sound carrier wave, to realize a suitable value for the intermediate frequency of the image channel, this possibility being of particular utility in the use of part of a broadcast sound receiver.

The choice of the frequency of the auxiliary oscillation provides an intermediate frequency for the image signals which appreciably exceeds that occurring in the known receivers, with the result that the probability that, for example, whistling noise may be produced, is materially reduced.

In order that the invention may be more clearly understood and readily carried into effect, it will now be described more fully with reference to the accompanying drawing, which shows some few forms of television receiver according to the invention.

In the television receiver shown in Fig. 1, an oscillation having a frequency $F_b$, modulated by the image content and an oscillation having a frequency $F_g$, modulated by the television sound, are set up in the aerial 1.

After amplification in a high-frequency amplifier 2, if necessary, the said oscillations are fed to a mixing stage which comprises, for example, a heptode 3. This mixing stage has also fed to it an auxiliary oscillation of frequency $F_o$ from a local oscillator 4.

The output circuit of the heptode 3 includes two tuned circuits 5 and 6.

Abstracted from the circuit 5, which is tuned, for example, to the difference frequency $F_b—F_o$, is a voltage which comprises the image content of the television signal required to be received. This signal is then fed in the usual manner, through intermediate-frequency amplifiers 7 and 8 and a detector stage 9, to a reproducing tube 10.

The circuit 6, from which a voltage is abstracted which contains the sound to be transmitted, is not tuned to, for example, the difference frequency $F_g—F_o$, but to a frequency $F_g—2F_o$ or $2F_o—F_g$.

The voltage abstracted from this circuit 6 is then fed to an intermediate-frequency amplifying stage 11 of a conventional broadcast receiver which comprises in addition a detector, a low-frequency amplifying stage 12 and a loudspeaker.

If the circuit 6 is tuned, for example, to the frequency $F_g—2F_o$, it is obvious that $F_o$, that is to say the frequency of the local oscillator 4, is required to be such that $F_g—2F_o$ corresponds with the intermediate frequency of the broadcast receiver.

This choice of the frequency $F_o$ has the effect of also determining the intermediate-frequency $F_b—F_o$, which occurs in the image receiver. That in the present case the said intermediate frequency for the image signals is by far more favourable than in the known receiver may be set out with reference to the following example, in which frequencies used in practice are chosen.

It is assumed that the carrier-wave for the image signal has a frequency $F_b$=45 mc., the frequency $F_g$ is 41.5 mc., whereas the intermediate frequency for a conventional broadcast receiver is 452 kc.

In the known television receivers for example, the intermediate frequencies $F_b—F_o$ and $F_g—F_o$ occur, the latter having to be 452 kc., so that $F_g—F_o$=0.452 mc. and $F_g$ being 41.5 mc. it follows that $F_o$=41.048 mc.

It follows for the intermediate-frequency in the image channel $F_b—F_o$=3.952 mc., this intermediate frequency being therefore low compared with the image carrier-wave frequency of 45 mc.

Accordingly it is very difficult to ensure satisfactory image reception in this manner.

In the receiver according to the invention, for example, the intermediate frequencies $F_b—F_o$ and $F_g—2F_o$ occur, the latter having again to be equal to 452 kc. With $F_g$=41.5 mc., this provides a frequency $F_o$=20.542 mc.

In the image channel an intermediate frequency $F_b—F_o$=24.476 mc. is thus produced, which intermediate frequency consequently exceeds half the value $F_b$, so that the possibility that satisfactory image reception may be obtained has materially increased.

Figure 2:
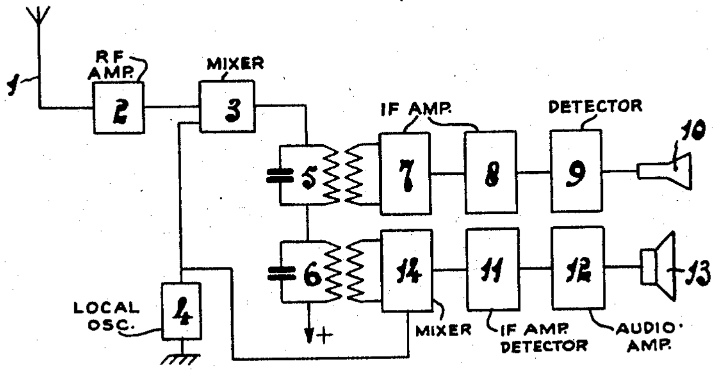

Fig. 2 shows a further form of receiver according to the invention.

As in the embodiment shown in Fig. 1, the signal received through the aerial 1 is fed through a possible high-frequency amplifier 2, together with an auxiliary oscillation from a local oscillator 4, to a mixing stage 3, the output circuit of the mixing stage comprising two circuits 5 and 6 and the circuit 5 being tuned to the difference frequency $F_b—F_o$.

The circuit 6, on the contrary, is tuned to the frequency $F_g—F_o$ and a voltage of this frequency is fed, together with a voltage of frequency $F_o$ from the local oscillator 4 to a mixing stage 14 in such manner that the frequency $F_g—2F_o$ is set up across the output circuit of this mixing stage. This voltage is again fed to the intermediate-frequency stage 11 of the broadcast receiver, where the frequency $F_o$ is again chosen to be such that the frequency $F_g—2F_o$ corresponds with the intermediate frequency of the said broadcast receiver.

The rectangles in Figs. 1 and 2 represent standard circuits of conventional design. For instance, R.-F. amplifiers 2 may be of the type shown in Fig. 72, page 441 of Terman's "Radio Engineer's Handbook," first edition, while local oscillator 4, mixers 3 and 14, I-F. amplifiers 7, 8 and 11, detectors 8 and 11, reproducing tube 10 and audio amplifier 12 may be similar in design to the corresponding stages shown in Fig. 279, pages 452 and 453 of "Principles of Television Engineering," first edition, by D. G. Fink.

What I claim is:

1. In a television receiver adapted to derive image oscillations from a first intercepted carrier wave and sound oscillations from a second intercepted carrier wave, the combination comprising a source of local oscillations of constant frequency, a mixing system, means to apply said first and second intercepted carrier waves and said local oscillations to said mixing system, a first resonant circuit coupled to said mixing system and tuned to a frequency having a value equal to the algebraic sum of the frequency of said first carrier wave and the frequency of said local oscillations to derive a first intermediate frequency wave from said mixing system, and a second resonant circuit coupled to said mixing system and tuned to a frequency equal to the algebraic sum of the frequency of said second carrier wave and a multiple harmonic of the frequency of said local oscillations to derive a second intermediate frequency wave from said mixing system.

2. In a television receiver adapted to derive image oscillations from a first intercepted carrier wave and sound oscillations from a second intercepted carrier wave, the combination comprising a source of local oscillations of constant frequency, a mixing element, means to apply said first and second intercepted carrier waves and said local oscillations to said mixing element, a first resonant circuit coupled to said mixing element and tuned to a frequency having a value equal to the algebraic sum of the frequency of said first carrier wave and the frequency of said local oscillations to derive a first intermediate frequency wave from said mixing element, and a second resonant circuit coupled to said mixing element and tuned to a frequency equal to the algebraic sum of the frequency of said second carrier wave and a multiple harmonic of the frequency of said local oscillations to derive a second intermediate frequency wave from said mixing element.

3. In a television receiver adapted to derive image oscillations from a first intercepted carrier wave and sound oscillations from a second intercepted carrier wave the combination comprising a source of local oscillations of constant frequency, a mixing element, means to apply said first and second intercepted carrier waves and said local oscillations to said mixing element, a first resonant circuit coupled to said mixing element and tuned to a frequency having a value equal to the algebraic sum of the frequency of said first carrier wave and the frequency of said local oscillations to derive a first intermediate frequency wave from said mixing element, and a second resonant circuit coupled to said mixing element and tuned to a frequency equal to the algebraic sum of the frequency of said second carrier wave and the second harmonic of the frequency of said local oscillations to derive a second intermediate frequency wave from said mixing element.

4. In a television receiver adapted to derive image oscillations from a first intercepted carrier wave and sound oscillations from a second intercepted carrier wave, the combination comprising a source of local oscillations of constant frequency, an electron discharge tube having an input circuit and an output circuit, means to apply said first and second intercepted carrier waves and said local oscillations to said input circuit, a first parallel resonant circuit coupled to said output circuit and tuned to a frequency having a value equal to the algebraic sum of the frequency of said first carrier wave and the frequency of said local oscillations to derive a first intermediate frequency wave from said output circuit, and a second parallel resonant circuit coupled to said output circuit and tuned to a frequency equal to the algebraic sum of the frequency of said second carrier wave and a multiple harmonic of the frequency of said local oscillations to derive a second intermediate frequency wave from said output circuit.

5. In a television receiver adapted to derive image oscillations from a first intercepted carrier wave and sound oscillations from a second intercepted carrier wave, the combination comprising a source of local oscillations of constant frequency, a first mixing element, means to apply said first and second intercepted carrier waves and said local oscillations to said first mixing element, a first resonant circuit coupled to said first mixing element and tuned to a frequency having a value equal to the algebraic sum of the frequency of said first carrier wave and the frequency of said local oscillations to derive a first intermediate frequency wave from said first mixing element, a second resonant circuit coupled to said first mixing element and tuned to a frequency equal to the algebraic sum of the frequency of said second carrier wave and the frequency of said local oscillations to derive a second intermediate frequency wave from said first mixing element, a second mixing element, means to apply said second intermediate frequency wave and said local oscillations to said second mixing element, and a third resonant circuit coupled to said second mixing element and tuned to a frequency equal to the algebraic sum of the frequency of said second carrier wave and a multiple harmonic of the frequency of said local oscillations to derive a third intermediate frequency wave from said second mixing element.

PETER JOHANNES HUBERTUS JANSSEN.

REFERENCES CITED

The following references are of record in the file of this patent:

UNITED STATES PATENTS

| Number | Name | Date |
|---|---|---|
| 1,793,959 | Powell | Feb. 24, 1931 |
| 1,813,923 | Heising | July 14, 1931 |
| 2,088,432 | Peterson | July 27, 1937 |
| 2,165,794 | Holmes | July 11, 1939 |
| 2,186,455 | Goldmark | Jan. 9, 1940 |
| 2,271,418 | Eaglesfield | Jan. 27, 1942 |
| 2,273,134 | Mountjoy | Feb. 17, 1942 |
| 2,451,584 | Stone | Oct. 19, 1948 |
| 2,486,076 | Strutt | Oct. 25, 1949 |
| 2,528,222 | Foster | Oct. 31, 1950 |

FOREIGN PATENTS

| Number | Country | Date |
|---|---|---|
| 587,553 | Great Britain | Apr. 27, 1947 |